US010567236B2

(12) United States Patent
Coolbaugh et al.

(10) Patent No.: US 10,567,236 B2
(45) Date of Patent: Feb. 18, 2020

(54) COMMUNICATION ASSETS SURVEY AND MAPPING, NEXT GENERATION

(71) Applicant: The United States of America as represented by the Secretary of the Navy, San Diego, CA (US)

(72) Inventors: Eric J. Coolbaugh, Cardiff, CA (US); Robert J. Ryder, San Diego, CA (US)

(73) Assignee: United States of America as represented by Secretary of the Navy, Washington, DC (US)

( * ) Notice: Subject to any disclaimer, the term of this patent is extended or adjusted under 35 U.S.C. 154(b) by 301 days.

(21) Appl. No.: 15/844,814

(22) Filed: Dec. 18, 2017

(65) Prior Publication Data
US 2019/0190790 A1    Jun. 20, 2019

(51) Int. Cl.
*H04L 12/24* (2006.01)
*H04W 4/90* (2018.01)
*H04M 3/51* (2006.01)

(52) U.S. Cl.
CPC .......... *H04L 41/145* (2013.01); *H04L 41/22* (2013.01); *H04W 4/90* (2018.02); *H04L 41/08* (2013.01); *H04M 3/5116* (2013.01)

(58) Field of Classification Search
CPC .................................................. H04L 41/145
See application file for complete search history.

(56) References Cited

U.S. PATENT DOCUMENTS

| | | | |
|---|---|---|---|
| 6,567,533 B1 * | 5/2003 | Rhoads | G06K 7/1417 382/100 |
| 8,024,461 B1 * | 9/2011 | Ryder | G06Q 10/10 709/223 |
| 8,656,014 B1 | 2/2014 | Ryder | |
| 8,759,087 B2 | 6/2014 | Enzelberger | |
| 8,793,370 B1 | 7/2014 | Lane | |
| 9,112,773 B2 * | 8/2015 | Lane | G06Q 10/10 |
| 2004/0117358 A1 * | 6/2004 | von Kaenel | G06Q 40/08 |
| 2008/0109470 A1 * | 5/2008 | McGee | H04L 41/12 |
| 2011/0047230 A1 * | 2/2011 | McGee | H04L 41/0609 709/206 |

(Continued)

*Primary Examiner* — Moustafa M Meky
*Assistant Examiner* — Sm Z Islam
(74) *Attorney, Agent, or Firm* — Naval Information Warfare Center, Pacific; Kyle Eppele; Elliott J. Deaderick (57) ABSTRACT

A method for interacting with a communications asset survey and mapping tool via a graphical user interface (GUI) includes capability to view and modify data types overlaid on a map interface displayed in the GUI. The data types include at least two of fixed asset information, mobile asset information, public safety agencies, communications unit personnel, radio channel sharing and usage, radio system coverage data, event-incident common operation picture (COP), and Federal Communications Commission (FCC) information. Display of the data types on the map interface can be filtered based on at least one of an asset-owning organization and selected geographical areas including states and counties. Reports can be generated about the data-type information, and the reports can include analytics information that is filterable by at least one of an objects summary, fixed assets, and mobile assets. Data-type information can be exported to a third-party software application and formatted into tables.

12 Claims, 6 Drawing Sheets

(56) References Cited

U.S. PATENT DOCUMENTS

| | | | | |
|---|---|---|---|---|
| 2012/0259540 A1* | 10/2012 | Kishore | ............... | G06Q 10/06 |
| | | | | 701/410 |
| 2014/0101601 A1* | 4/2014 | Tang | ............... | G06F 16/29 |
| | | | | 715/781 |
| 2017/0249711 A1* | 8/2017 | Odegard | ............... | G06Q 50/16 |
| 2017/0337813 A1* | 11/2017 | Taylor | ............... | G08G 1/0141 |

* cited by examiner

COMMUNICATION ASSETS SURVEY AND MAPPING, NEXT GENERATION

FEDERALLY-SPONSORED RESEARCH AND DEVELOPMENT

The Communication Assets Survey and Mapping, Next Generation is assigned to the United States Government. Licensing inquiries may be directed to the Office of Research and Technical Applications, Space and Naval Warfare Systems Center Pacific, Code 72120, San Diego, Calif. 92152. Phone: (619) 553-5118; email: ssc_pac_t2@navy.mil. Reference Navy Case No. 103446.

CROSS-REFERENCE TO RELATED APPLICATIONS

This application is related to the following issued patents: U.S. Pat. No. 8,024,461, entitled "Communication Assets Survey And Mapping Tool" and issued on 20 Sep. 2011; U.S. Pat. No. 8,656,014, entitled "Communication Assets Survey And Mapping Tool With Add/Edit Feature" and issued on 18 Feb. 2014; U.S. Pat. No. 8,769,087, entitled "Communication Assets Survey And Mapping Tool With Data Export Feature" and issued on 1 Jul. 2014; U.S. Pat. No. 8,793,370, entitled "Communication Assets Survey And Mapping Tool" and issued on 29 Jul. 2014; and U.S. Pat. No. 9,112,773, entitled "Communication Assets Survey And Mapping Tool" and issued on 18 Aug. 2015.

BACKGROUND

Since the events of Sep. 11, 2001, public safety communications leaders have struggled to efficiently collect, catalog, visualize, and integrate disparate forms of emergency radio communications information in an integrated fashion. Integration is needed to provide a common operational understanding of communications assets and systems necessary to plan effective and seamless emergency communications for significant incidents and events, especially those that involve multiple jurisdictions and responding agencies.

SUMMARY

The present disclosure describes a method for interacting with a communications asset survey and mapping tool via a graphical user interface (GUI). In accordance with one embodiment of the present disclosure, a method is provided that includes: providing capability for a user to view and modify data types overlaid on a map interface displayed in the GUI, wherein the data types include at least two of fixed asset information, mobile asset information, public safety agencies, communications unit personnel, radio channel sharing and usage, radio system coverage data, event-incident common operation picture (COP), and Federal Communications Commission (FCC) information; filtering display of the data types on the map interface based on at least one of an asset-owning organization and selected geographical areas including states and counties; controlling the user's ability to view and modify data-type information depending on at least one of the data type and an asset-owning organization; sharing privileges for viewing and modifying the data-type information, wherein the sharing is between an asset-owning organization and another organization or user, and wherein the sharing is enabled and disabled by the asset-owning organization; generating reports about the data-type information, wherein the reports include analytics information that is filterable by at least one of an objects summary, fixed assets, and mobile assets; and exporting the data-type information to a third-party software application, wherein the data-type information is formatted into tables.

BRIEF DESCRIPTION OF THE DRAWINGS

The elements in the figures may not be drawn to scale. Some elements and/or dimensions may be enlarged or minimized, as appropriate, to provide or reduce emphasis and/or further detail.

DETAILED DESCRIPTION OF VARIOUS EMBODIMENTS

References in the present disclosure to "one embodiment" or "an embodiment" means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of "the," "a," or "an" are employed to describe elements and components of the embodiments herein; this is done merely for grammatical reasons and to conform to idiomatic English. This detailed description should be read to include one or at least one, and the singular also includes the plural unless it is clearly meant otherwise.

The embodiments disclosed herein describe a next-generation communication assets survey and mapping tool (CASM NextGen) suitable for, e.g., allowing public safety agencies to inventory and access communication data, providing a common operational picture (COP) that integrates different sources of information into a single application, and aiding in efficient and rapid resource utilization prior to and during a planned event or disaster response.

Certain words and/or phrases may be used when referring to various embodiments of CASM NextGen and its features, for example:

"analog mode" may refer to a method of radio communication that typically employs Amplitude Modulation (AM) or Frequency Modulation (FM);

"communication site" may refer to a physical location (typically at higher elevations such as buildings, etc.) that house communication transmitters, receivers, repeater/base stations, power, shelter, tower and antenna equipment and infrastructure;

"conventional system type" may refer to a conventional radio system that operates on fixed channels, wherein each user group is permanently assigned a fixed frequency or a set of frequencies;

"digital mode" may refer to Voice Over IP communications (VoIP)—the digitization of a sound source via a digital signal processor and sending the digital information out over a computer network;

"dispatch center" may refer to a Primary Public Safety Answering Point (PSAP) responsible for 9-1-1 emergency services, dispatching various public safety first responders (e.g., Police, Fire, Emergency Medical), and coordinating other outside agency mutual aid services;

"event-incident common operation picture (COP)" may refer to a single identical display of relevant (operational) information (e.g., position of personnel, position and status of important infrastructure such as bridges, roads, communications resources, etc.) shared by more than one public safety agency;

"FCC information" may refer to data from the Federal Communications Commission Universal Licensing System (ULS; the data may be updated bi-weekly in CASM NextGen;

"fixed gateway" may refer to a fixed system capable of connecting various incompatible radios to one another and tying into internet protocol (IP)-based communications systems using various protocols;

"frequency band" may refer to a specific range of frequencies in the radio frequency (RF) spectrum, which is divided among ranges from very low frequencies (VLF) to extremely high frequencies (EHF), each band having a defined upper and lower frequency limit;

"mobile gateway" may refer to a mobile system (which may be housed in a communications vehicle) capable of connecting various incompatible radios to one another and tying into IP-based communications systems using various protocols;

"radio cache" may refer to a collection of land mobile radio (LMR) handheld radios pre-configured with proper communications channels and sufficiently charged to use on short notice during incident response;

"radio channel sharing and usage" may refer to shared radio channels that are specific radio resources shared with other public safety agencies and disciplines throughout a trunked radio system, and the usage of shared channels may improve the efficient use of radio spectrum;

"radio system" may refer to the radio equipment involved in communication systems that includes a transmitter and a receiver, wherein each system may have an antenna and appropriate terminal equipment such as a microphone at the transmitter, and may have a loudspeaker at the receiver in the case of a voice-communication system;

"radio system coverage data" may refer to data used to determine if a radio system can be used to connect a transmitting resource to a receiving resource over a given geographic area;

"radio tower" may refer to a radio mast and/or tower and is typically a tall structure designed to support antenna (s) (also known as aerials) for telecommunications and broadcasting;

"repeater" may refer to an electronic device that receives a signal and retransmits it;

"transceiver" may refer to a transmitter/receiver radio system; and

"trunked system type" may refer to a system type unlike a conventional radio which assigns users a certain frequency—a trunked system may take a number of frequencies allocated to the system, and a control channel coordinates the system to enable talk groups to share these frequencies seamlessly.

Figure 1:
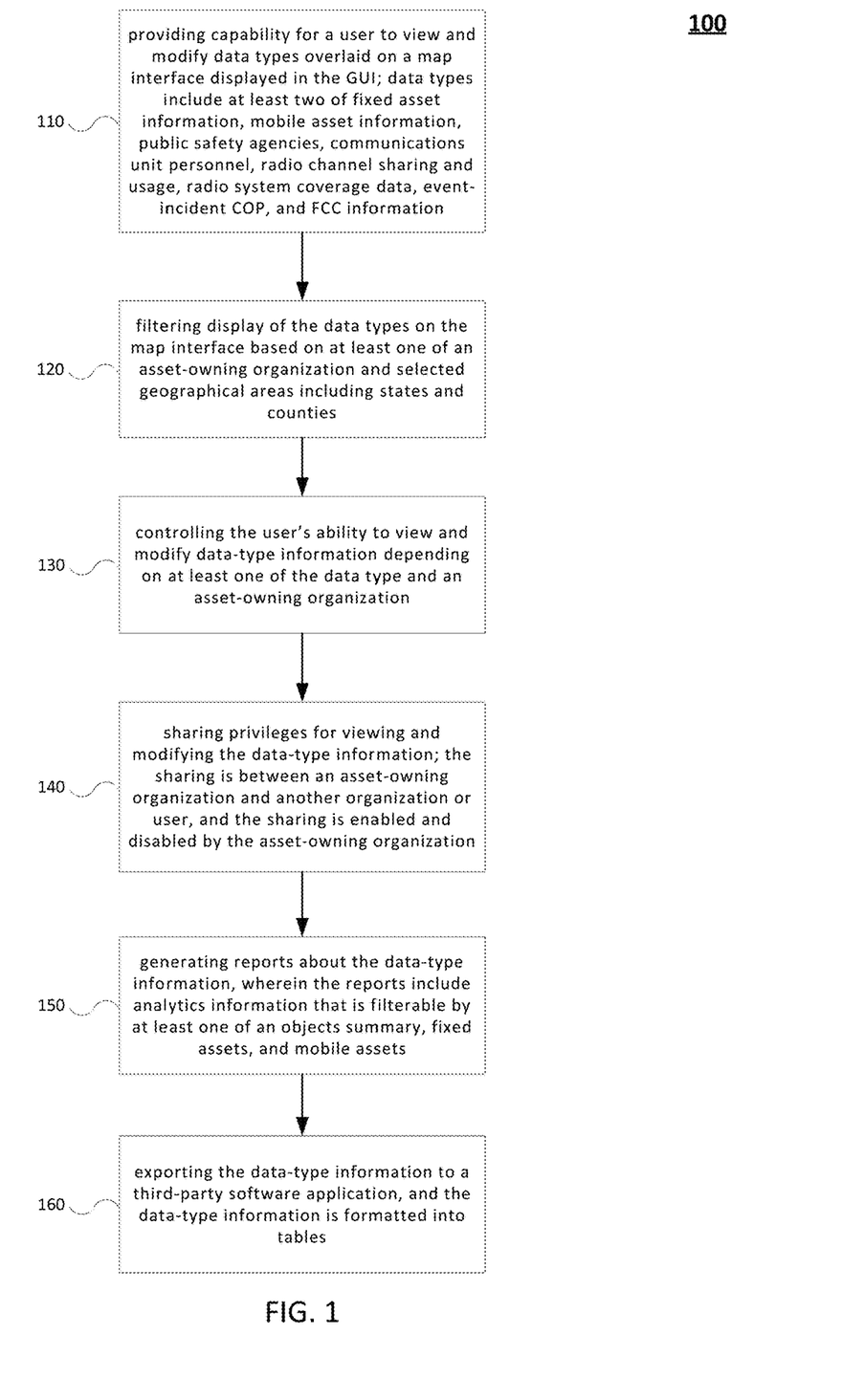
FIG. 1 is a flowchart of an embodiment of a method in accordance with the Communication Assets Survey and Mapping Tool, Next Generation.

FIG. 1 shows a flowchart diagram illustrating an embodiment of a method 100 for interacting with CASM NextGen via a graphical user interface (GUI). Method 100 may be implemented as a series of modules, and the modules may function in concert with physical electronic and computer hardware devices. Such modules may be utilized separately and/or together locally and/or remotely to form a program product thereof, which may be implemented through recordable media. Some of the steps of method 100 may be stored within a non-transitory computer-readable medium, wherein the steps are represented by computer-readable programming code.

For illustrative purposes, method 100 will be discussed with reference FIG. 1 and various other figures. Additionally, while FIG. 1 shows an embodiment of method 100, other embodiments of method 100 may contain fewer or more steps. Further, while in some embodiments the steps of method 100 may be performed as shown in FIG. 1, in other embodiments the steps may be performed in a different order, or certain steps may occur simultaneously with one or more other steps. The abovementioned considerations regarding method 100 are also applicable to method 600 shown in FIG. 6.

In FIG. 1, method 100 comprises step 110, which includes providing capability for a user to view and modify data types overlaid on a map interface 200 (see FIG. 2) displayed in the GUI. The data types may include at least two of fixed asset information, mobile asset information, public safety agencies, communications unit personnel, radio channel sharing and usage, radio system coverage data, event-incident common operation picture (COP), and Federal Communications Commission (FCC) information.

Fixed asset information may include radio systems, fixed gateways, dispatch centers, communication sites, transceivers, and radio towers. Mobile asset information may include mobile communication units (MCUs), radio systems, repeaters, mobile gateways, and radio caches. An MCU may be a vehicle that is equipped with various types of hardware for mobile communication including radios, a mobile conference center, video conferencing equipment, handheld electronic devices, laptop computers, etc. Different types of vehicles may be used as MCUs, including: cars, trucks, vans, sport-utility vehicles, and 18-wheel tractor trailers.

Figure 2:
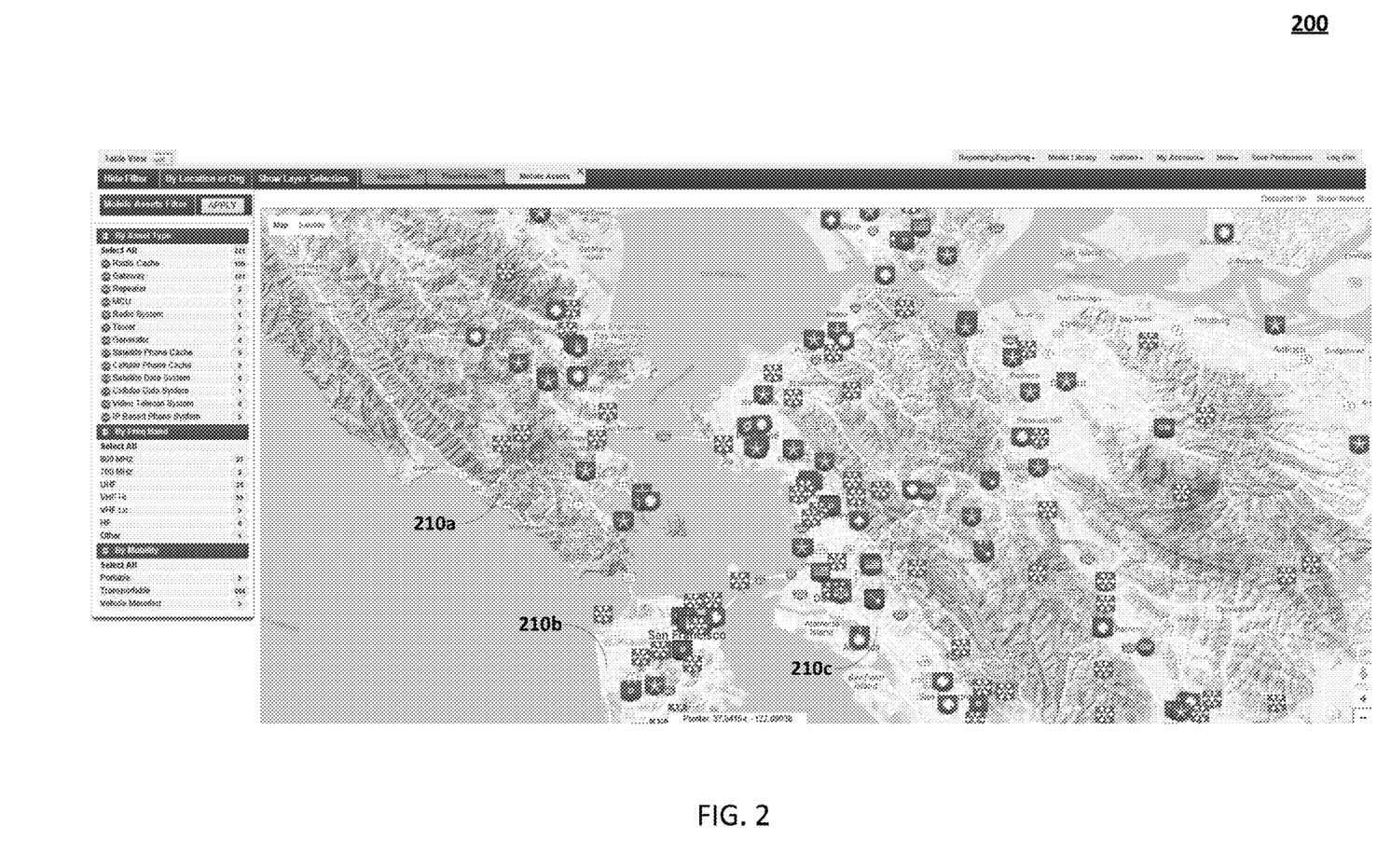
FIG. 2 is an example illustration of a map interface in accordance with the Communication Assets Survey and Mapping Tool, Next Generation.

Step 120 includes filtering display of the data types on the map interface 200 based on at least one of an asset-owning organization (see FIG. 3A) and selected geographical areas (see FIG. 2), which may include one or more of states and counties. FIG. 2 shows a map including multiple counties in California (e.g., Marin County 210a, San Francisco County 210b, and Alameda County 210c). Although FIG. 2 shows multiple counties in a single state, map interface 200 may be configured to display multiple states and multiple counties (not shown).

In some embodiments, displayed fixed asset information may be further filtered by at least one of frequency band, trunked system type, conventional system type, analog mode, and digital mode. Similarly, displayed mobile asset information may be further filtered by at least one of frequency band, trunked system type, conventional system type, analog mode, and digital mode.

Figure 3A:
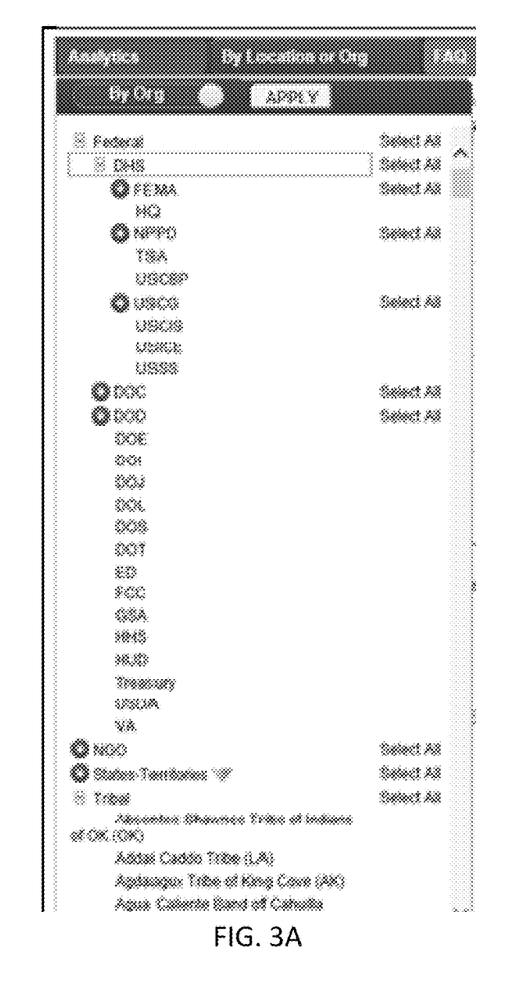
FIGS. 3A-3B illustrate examples of filter options associated with analytics information in accordance with the Communication Assets Survey and Mapping Tool, Next Generation.

Step 130 includes controlling the user's ability to view and modify data-type information depending on at least one of the data type and an asset-owning organization (see FIG. 3A).

Step 140 includes sharing privileges for viewing and modifying the data-type information, wherein the sharing may be between an asset-owning organization (see FIG. 3A) and another organization or user. The sharing may be enabled and disabled by the asset-owning organization.

Step 150 includes generating reports about the data-type information. The reports may include analytics information 400 (see FIG. 4) that may be filterable by at least one of an objects summary, fixed assets, and mobile assets. The analytics information 400 may also be filterable according to geographical locations (FIG. 3B) including states and counties, and multiple states and counties may be selected. The analytics information may also be filterable according to an asset-owning organization (FIG. 3A), and sub-levels of the asset-owning organization may be selected.

Step 160 includes exporting the data-type information to a third-party software application, wherein the data-type information may be formatted into tables.

Figure 5A:
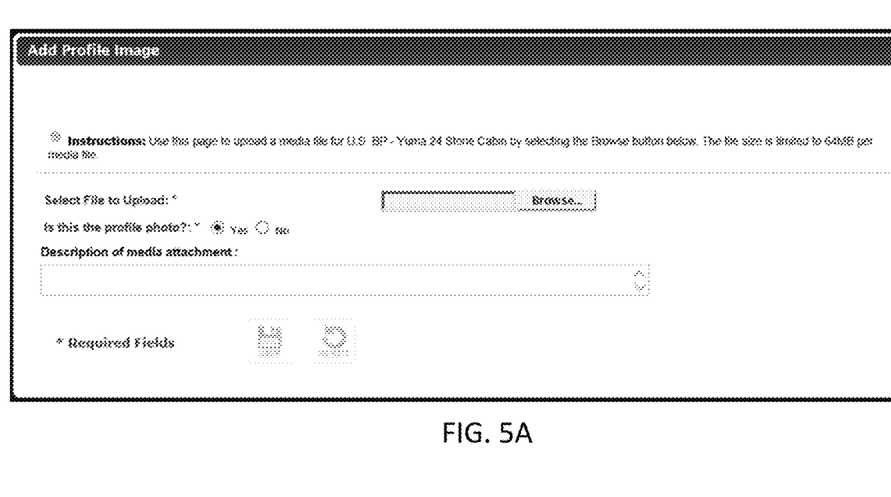
FIGS. 5A-5B show examples of an interface for uploading files and/or media attachments in accordance with the Communication Assets Survey and Mapping Tool, Next Generation.
Figure 5B:
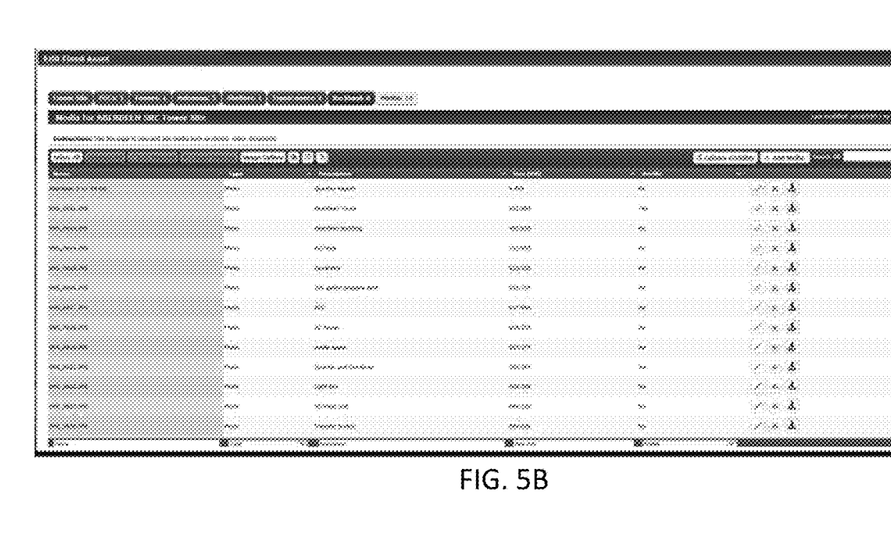

In some embodiments, method 100 may include a step for up-loading files (e.g., media attachments) and associating the media attachments with a selected data type (see FIGS. 5A-5B). Uploaded files/attachments may include audio, video, images, and/or text. Sharing privileges enabled by an asset-owning organization may allow a user to download any or specific files/attachments in accordance with the enabled privileges.

In some embodiments, method 100 may include a step for providing the capability to switch the map interface 200 (FIG. 2) to a tabular interface (e.g., "table view") that is sortable and filterable.

In some embodiments, method 100 may include a step for selecting data types via a GUI menu configured to allow a user to establish a relationship between the selected data types.

In some embodiments, method 100 may include a step for accessing the GUI via an internet web browser (e.g., Microsoft Internet Explorer, Google Chrome, Mozilla Firefox, etc.).

Figure 6:
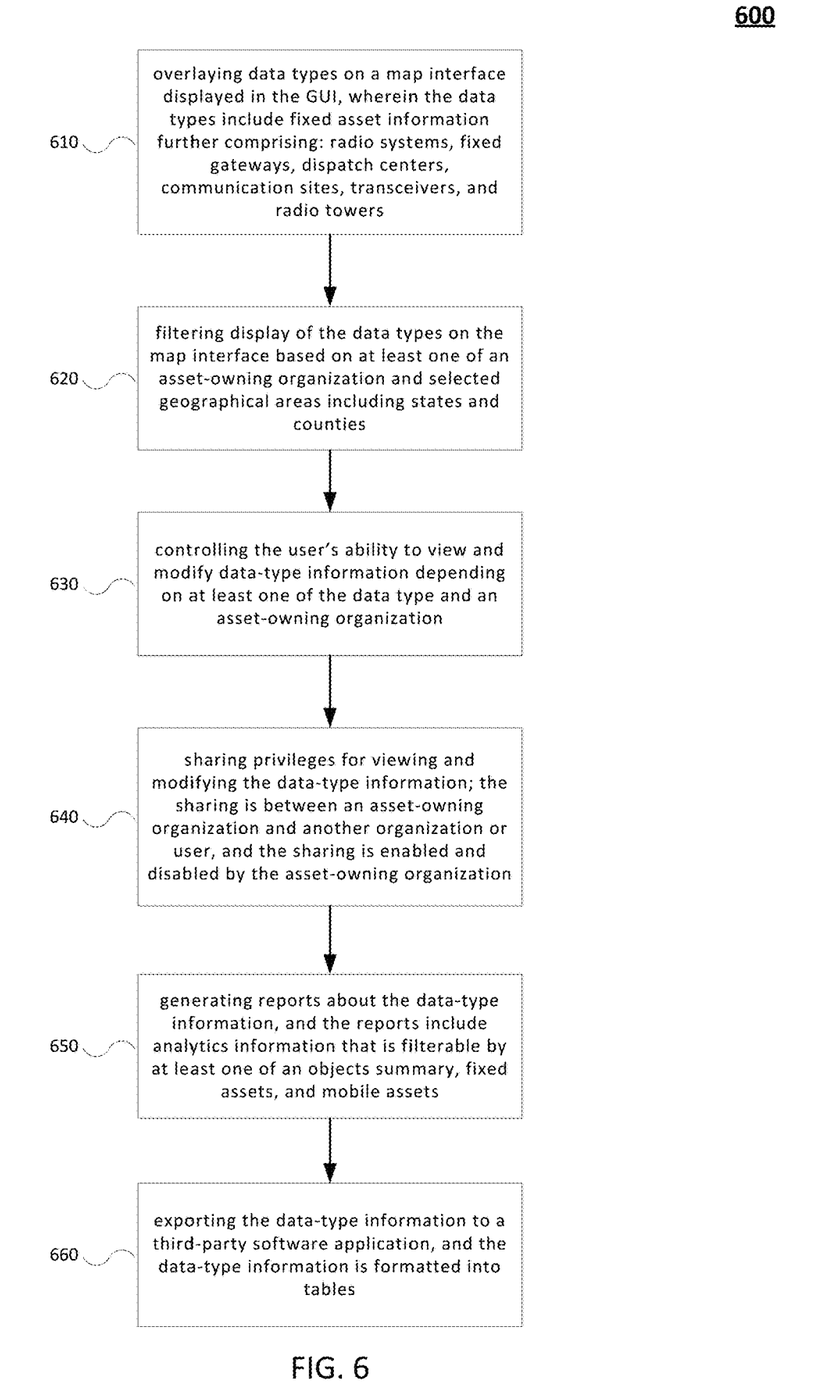
FIG. 6 is a flowchart of another embodiment of a method in accordance with the Communication Assets Survey and Mapping Tool, Next Generation.

FIG. 6 shows a flowchart diagram illustrating another embodiment of a method for interacting with CASM NextGen via a GUI. Method steps in method 600 that are substantially similar to method steps in method 100 will not be further described (i.e., steps 620-660, which are in keeping with steps 120-160 of method 100).

Method 600 includes step 610, which includes overlaying data types on a map interface 200 (FIG. 2) displayed in the GUI, wherein the data types include fixed asset information further comprising: radio systems, fixed gateways, dispatch centers, communication sites, transceivers, and radio towers.

Figure 3B:
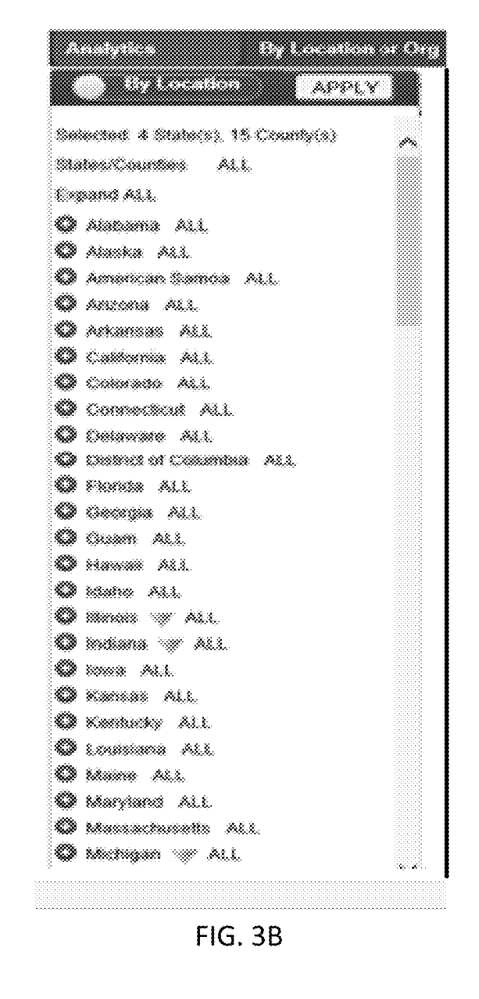
Figure 4:
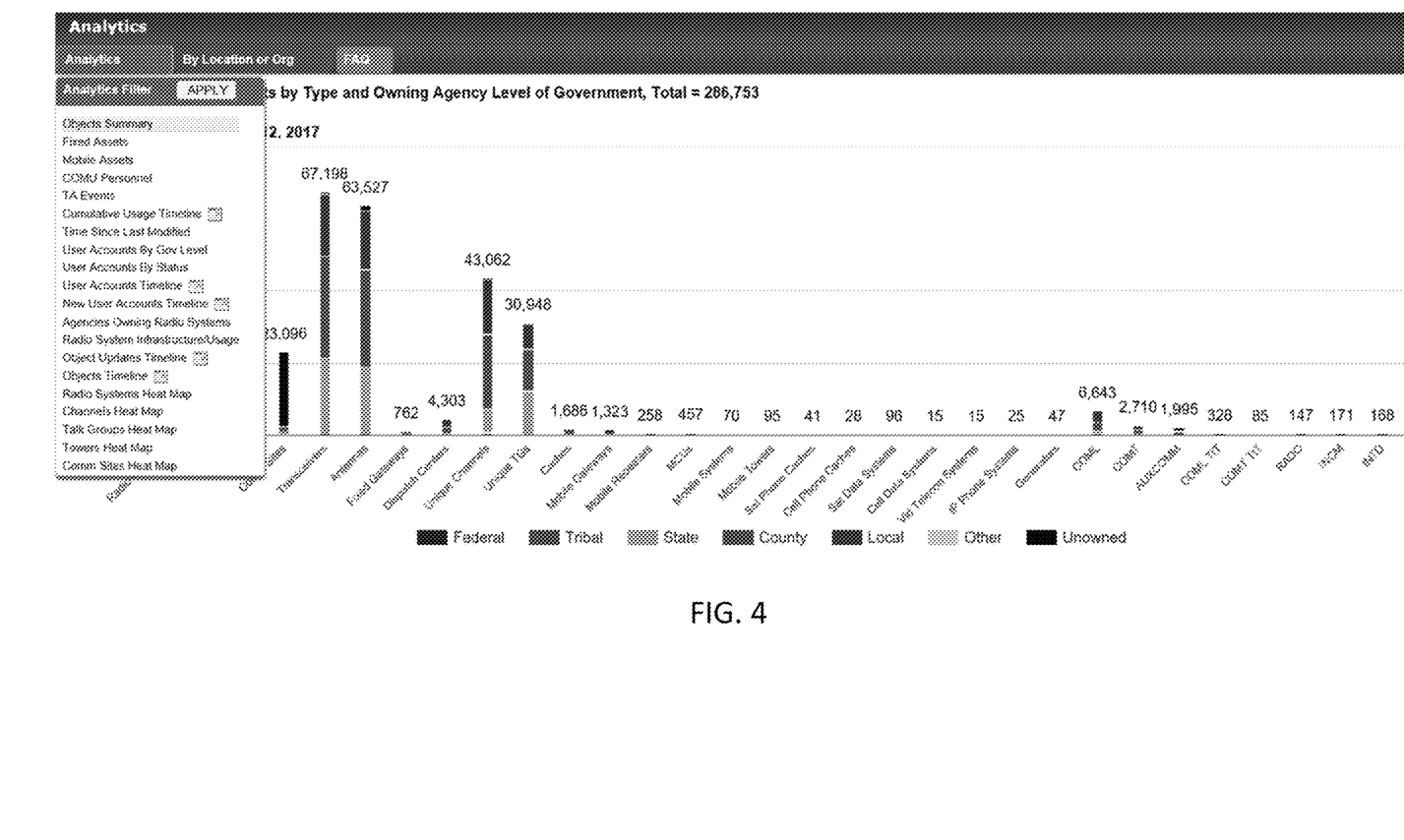
FIG. 4 shows an example of analytics information in accordance with the Communication Assets Survey and Mapping Tool, Next Generation.

In some embodiments, the analytics information 400 (FIG. 4) (see also step 650 in FIG. 6) may also be filterable according to geographical locations including states and counties, and multiple states and counties may be selected (see FIG. 3B). The analytics information may also be filterable according to an asset-owning organization, and sublevels of the asset-owning organization may be selected (see FIG. 3A).

In some embodiments, method 600 may include a step for up-loading files (e.g., media attachments) and associating the media attachments with a selected data type (see FIGS. 5A-5B). Uploaded files/attachments may include audio, video, images, and/or text. Sharing privileges enabled by an asset-owning organization may allow a user to download any or specific files/attachments in accordance with the enabled privileges.

In some embodiments, CASM NextGen may be implemented as a web-based software application that may allow public safety agencies to inventory and access communications data entered by a broad spectrum of users nationwide through a single tool. CASM NextGen may feature a comprehensive emergency communications database that provides a national-level view of communications information that can be accessed and shared between any variety of jurisdictions and government types. For example, CASM NextGen may provide access for approved local, state, tribal, federal and non-governmental organization (NGO) users to information including: fixed asset information, mobile asset information, communications unit personnel, radio channel sharing and usage, public safety agencies, radio system coverage data, federal communications commission (FCC) information, mobile data survey responses, and system metrics.

In some embodiments, CASM NextGen data may be filterable (e.g., by a data type) and may be overlaid on a map interface or may be displayed in a standardized tabular format. CASM NextGen may feature a graphical user interface (GUI) that may be securely accessed via a single sign-on. Access to CASM NextGen may be profile-based such that users may only have access to information that they are authorized to view and/or edit. CASM NextGen may be virtually hosted without dedicated hardware.

In some embodiments, users can filter data pertaining to data types and/or assets based on location or organization. Location-based filtering may allow a user to select a particular geographical area to view based on selected counties or states, regardless of an asset-owning organization. Organization-based filtering may allow a user to view assets for selected asset-owning organizations regardless of location.

For example, setting a filter may cause data types to be turned on or off as data layers such that data types can be chosen for display on the map interface as a data layer(s). Data layers can be turned on or off according to a user's needs. Icons for each data type may be presented on the screen and may be selected to display more information or moved as needed. Such functionality can allow direct map editing so information can be directly accessed and updated from the map interface. Alternatively, a user may switch from a map view to a table view that provides a detailed tabular view of the relevant data.

In some embodiments, CASM NextGen may provide a centralized, open-architecture data repository for agencies to store, maintain, and share information about their resources. CASM NextGen may provide public safety emergency communications personnel with the capability to freely and securely share, inventory, maintain, standardize, control, and output information about their statuses and resources (e.g., communications assets and personnel) for the purposes of planning and executing communications operability and interoperability—the ability to exchange and make use of information, and to allow agencies/organizations to operate in conjunction with one another. CASM NextGen may aid in enabling public safety leaders to locate, request, view the status of, and understand resources owned by other agencies that may be available for the purposes of planning and executing communications operability and interoperability. Agencies that are anticipating or conducting emergency communications operations can share information about their resources with other participating agencies. Together, these agencies can see the same information and may plan optimal use of various resources.

In some embodiments, CASM NextGen may be available online through a web browser. Users can view information on a map interface, such as Google Maps, or via table views. Information about relationships between Radio Systems, Agencies, Communications Sites, Transceivers, Antennas, Towers, Shelters, Radios, Channels, Dispatch Centers, Users, and Mobile Assets is maintained. Each asset-owning organization owns, maintains, and controls access to all data it stores in CASM NextGen. In some embodiments, mobile applications may provide access to CASM NextGen information in the field.

In one example scenario, the United States Coast Guard (USCG), Customs and Border Protection (CBP), San Diego Sheriff's Office, San Diego Police Department, San Diego Harbor Patrol, San Diego Fire (Lifeguard), and University of California Campus Police may plan a month-long operation to curtail illegal immigration, and drug and human trafficking across the US-Mexico border via ocean vessels landing along the San Diego coastline.

All participating agencies may populate a single, centralized CASM NextGen tool with information about the radio systems, channels, mobile assets, and communications personnel being deployed for the operation. Each agency may give the other participating agencies permission to view its information. USCG, the lead agency, may generate a report showing all resources available for interoperability. All agencies may meet and plan for use of interoperable resources. The centralized tool may be updated with the use and common channel naming information, which may then be exported via third-party software, e.g., Microsoft Excel, spreadsheets and distributed to agency personnel. Each agency may review their radio programming and common channel access prior to the operation. During the operation, communications between agencies may be accomplished with updates being made to the centralized tool for subsequent distribution. Because of efficient and timely communication between agencies using CASM NextGen, smugglers may be identified, stopped, and taken into custody.

In another example scenario, a major hurricane may be forecast to hit central Florida in 60 hours. Florida may need to identify emergency communications resources available for storm surge purposes and to assist anticipated response agencies.

Because response agencies may populate a centralized CASM NextGen tool with information about communications resources, the lead personnel in the Florida region may access the tool and identify mobile resources and spectrum resources available for deployment and interoperability prior to hurricane landfall. Mobile resources may be strategically positioned as the projected path of the hurricane becomes more reliable. If the hurricane crosses through a highly populated area, emergency responders may be able to coordinate their priorities and resources across multiple counties and for many days. Because the information may be standardized with other agencies using the CASM NextGen tool, responders can engage in consistent, uniform dialog regarding communications resources and their use. For example, channel names may be referred to consistently by responders for efficient radio communication, thereby minimizing or eliminating unsuccessful attempts to communicate. Additionally, all communications responders may access CASM NextGen and see which emergency communications assets (e.g., towers, systems, etc.) may have been damaged by the hurricane and are no longer available for use.

CASM NextGen may have various functional capabilities as part of its operation. No one functional capability is considered controlling, and the implementation/use of functional capabilities may vary depending on system/tool configurations and/or user access permissions. Examples of functional capabilities are described below and may include: User Access Availability, User Access Control, Data Sharing, Data Entry/Edit, Data Export/Reporting, Data Importing, Data Display, Establishing Object Relationships, Data Filtering/Sorting/Finding, Data Security, Mobile Data Access, Data Storage, Data Integrity Maintenance, Coverage Plot Generation, and Interoperability Assessment.

User Access Availability includes, but is not limited to, providing CASM NextGen as an automated communications planning tool for public safety professionals (e.g., fire, law enforcement, emergency management, etc.) at all jurisdictional levels (local, state/territory, federal, tribal, NGO).

User Access Control includes, but is not limited to, giving users permission to view/edit data based on their need to know or maintain data. The need to know may be determined by an access manager for the user's organization. The access manager may grant users various privileges that are related to different types of data; therefore, access permissions may be based on the user's organization, as well as the specific privileges granted by the organization. Access managers may add/delete user accounts and may add/edit/delete information about user accounts including user profiles, user permissions, and passwords.

Data Sharing includes, but is not limited to, granting permission, by the access manager, for any user to view/edit data controlled by the access manager's organization. Access managers may implement information sharing privileges to share/unshare data with users associated with agencies related to specific organizational nodes.

Data Entry/Edit includes, but is not limited to, an interface allowing users to enter and modify data based on their user access permissions. The interface may be standardized but may also be specific to data types and may have required fields enabling relationships between data types. The interface may show labels that can be entered or updated in a text format for each required field. Users may also upload media associated with data objects/types, e.g., media files/attachments that include audio, video, images, text, or any combination thereof. Examples of data types that may be entered, edited, or deleted include: public safety radio and data communications assets including equipment, infrastructure, users, spectrum usage, asset-owning organizations, locations, and nationwide capabilities; fixed assets including fixed gateways, dispatch centers, communication sites, and radio systems; mobile assets including mobile communication units (MCUs), radio caches, radio systems, repeaters, and mobile gateways; and first responder personnel including agency affiliation, training, and location.

Data Export/Reporting includes, but is not limited to, exporting information to third party software (e.g., Adobe Acrobat or Microsoft Excel) for any data type. Reports may include any data related to a data object/type. Examples of exporting/reporting include: exporting data or producing reports on public safety radio and data communications assets including equipment, infrastructure, users, spectrum usage, asset-owning organizations, locations, and nationwide capabilities; exporting data or producing reports on FCC data including geographic areas, FCC data types, frequencies, and radio system structures (e.g., towers, antennas, etc.); and exporting data or producing reports on capability, performance, response, and technology details concerning National Emergency Communication Plan (NECP) assessments.

Data Importing includes, but is not limited to, an interface allowing users to upload data from a spreadsheet format (e.g., Microsoft Excel). The uploaded data may be reviewed by a system administrator or other reviewer prior to importing to ensure that the data is properly formatted with data objects properly populated and that correct relationships between data objects are established. In some embodiments the reviewer may be a help desk having resources/tools to import user-provided communications asset data and import source data. The data may be imported after the review is completed. Additional capabilities may be provided to import data from other sources/tools such as the Mobile Data Survey Tool (MDST), the FCC database, national agency identification lists, and other sources needed for user-entered display and/or analysis.

Data Display includes, but is not limited to, viewing in a web browser as filtered layers on a map interface such as Google Maps. Data may also be viewed in a tabular format that can be sorted and filtered. Switching between a map view and a table view for the same data may be performed at the user's discretion. Examples of data that may be displayed with display filtering options include: viewing public safety radio and data communications assets including equipment, infrastructure, users, spectrum usage, asset-owning organizations, locations, and nationwide capabilities; viewing fixed assets including fixed gateways, dispatch centers, communication sites, and radio systems; viewing mobile assets including MCUs, radio caches, radio systems, repeaters, and mobile gateways; viewing coverage plots generated by the system that show the areas of radio coverage for individual transceivers; viewing user-selected map overlays including telecommunications data, FirstNet planning data, infrastructure (airports, railroads, etc.), and emergency planning (hurricane evacuation routes, Federal Emergency Management Agency (FEMA) regions, etc.); viewing information about first responder personnel including location, jurisdiction, and discipline; viewing technical assistance reports and other files; viewing information about capability, performance, response, and technology details concerning NECP assessments; viewing FCC data including geographic areas, FCC data types, frequencies, and radio system structures (e.g., towers, antennas, etc.); viewing MDST analysis results; viewing system metrics; viewing account management and information sharing functions; viewing user account information including user profiles, permissions, and passwords; and providing the capability to select and display uploaded media files associated with data types.

Establishing Object Relationships includes, but is not limited to, relating data objects/types to one another through the user interface for the objects. For example, a user may relate shelters, towers, transceivers, and antennas to one another and to a communication site through a communication site object user interface page. Existing objects in the database may be options in a pull-down menu available for users to establish the relationship. Other examples may include: providing the capability to add/edit/delete fixed asset and mobile asset data associations with other data objects in the system; displaying fixed assets and mobile asset data associations with other data objects in the system; providing the capability to add/edit/delete personnel and agency data associations with other data objects in the system; and displaying personnel and agency data associations with other data objects in the system.

Data Filtering/Sorting/Finding includes, but is not limited to, locating information about data objects/types by using filters in either the map view or the table view. The tabular view format can also be sorted by column. In the map view, objects can be located by the display of an object names list for currently displayed objects on the map. Examples of data filtering/sorting/finding may include: providing the capability for users to define custom data layers; providing filtering for selecting and/or sorting data sets that comprise various data types; providing filtering of fixed assets information including frequency band, trunked system type, conventional system type, analog mode, and digital mode; providing filtering of mobile asset information including frequency band, portable mobility type, transportable mobility type, and vehicle mounted mobility type; filtering FCC data including geographic area, FCC data type, frequency, and radio system structure (e.g., towers, antennas, etc.); and filtering first responder personnel information including location, jurisdiction, and discipline.

Data Security includes, but is not limited to, encrypting data transmissions across the internet. System access may be controlled via user account sign-in including username and passwords requirements.

Mobile Data Access includes, but is not limited to, providing a mobile application to allow users to view and interact with CASM NextGen on mobile devices (e.g., mobile devices running mobile operating systems such as Google Android or Apple iOS).

Data Storage includes, but is not limited to, the following examples: storing all user-entered public safety radio and data communications assets including equipment, infrastructure, users, spectrum usage, asset-owning organizations, locations, and nationwide capabilities; storing any ancillary data required for user-entered data analysis; storing fixed asset information; storing fixed asset information including fixed gateways, dispatch centers, communication sites, and radio systems; storing mobile asset information including MCUs, radio caches, radio systems, repeaters, and mobile gateways; storing coverage plots generated by the system that show areas of radio coverage for individual transceivers; storing user-selected map overlays including telecommunications data, FirstNet planning data, infrastructure (airports, railroads, etc.), and emergency planning (hurricane evacuation routes, FEMA regions, etc.); storing information about first responder personnel including location, jurisdiction, and discipline; providing the capability to upload and store technical assistance reports and other files; storing information about capability, performance, response, and technology details concerning NECP assessments; storing FCC data including geographic areas, FCC data types, frequencies, and radio system structures (e.g., towers, antennas, etc.); storing MDST analysis results; storing system metrics; storing account management and information sharing functions; storing user account information including user profiles, permissions, and passwords; providing the capability to upload and store media files/attachments associated with data types; and backing up system data daily and storing backed-up data in a secure location.

Data Integrity Maintenance includes, but is not limited to: providing the capability to generate and view reports that enable users to analyze the integrity of their data and take appropriate action; and monitoring/correcting data integrity issues via a reviewer (e.g., a help desk) as they occur and in keeping with user needs.

Coverage Plot Generation includes, but is not limited to, providing radio system coverage layers, and providing the capability for users to generate coverage plot overlays for any transceiver defined in the system so long as all required fields for coverage plot overlay generation are completed. Multiple coverage plot overlays each having different parameters may be generated for a transceiver. The parameters can be viewed via the map interface. The coverage plot overlays may include elevation data.

Interoperability Assessment includes, but is not limited to, providing users the ability to assess options for establishing interoperability between agencies via examining or generating reports for multiple agencies in a geographic region. Users may also access and display information regarding interoperability channels that have been established at various levels (e.g., federal, state, and regional).

The use of any examples, or exemplary language ("e.g.," "such as," etc.), provided herein is merely intended to better illuminate and is not intended to pose a limitation on the scope of the subject matter unless otherwise claimed. No language in the present disclosure should be construed as indicating that any non-claimed element is essential.

Many modifications and variations of the Communication Assets Survey and Mapping Tool, Next Generation are possible in light of the above description. Within the scope of the appended claims, the embodiments of the method described herein may be practiced otherwise than as specifically described. The scope of the claims is not limited to the disclosed implementations and embodiments but extends to other implementations and embodiments as may be contemplated by those having ordinary skill in the art.

What is claimed is:

1. A method for interacting with a communications asset survey and mapping tool via a graphical user interface (GUI), the method comprising:
   providing capability for a user to view and modify data types overlaid on a map interface displayed in the GUI, wherein the data types include at least two of fixed asset information, mobile asset information, public safety agencies, communications unit personnel, radio channel sharing and usage, radio system coverage data, event-incident common operation picture (COP), and Federal Communications Commission (FCC) information;
   filtering display of the data types on the map interface based on at least one of an asset-owning organization and selected geographical areas including states and counties;
   controlling the user's ability to view and modify data-type information depending on at least one of the data type and an asset-owning organization;
   sharing privileges for viewing and modifying the data-type information, wherein the sharing is between an asset-owning organization and another organization or user, and wherein the sharing is enabled and disabled by the asset-owning organization;
   generating reports about the data-type information, wherein the reports include analytics information that is filterable by at least one of an objects summary, fixed assets, and mobile assets; and
   exporting the data-type information to a third-party software application, wherein the data-type information is formatted into tables.

2. The method of claim 1, wherein the analytics information is filterable according to geographical locations including states and counties and allows multiple states and counties to be selected, and
   wherein the analytics information is filterable according to an asset-owning organization and allows sub-levels of the asset-owning organization to be selected.

3. The method of claim 1, further comprising uploading at least one media attachment and associating the at least one media attachment with a selected data type, wherein the at least one media attachment includes at least one of audio, video, images, and text, and
   wherein the sharing privileges allow an asset-owning organization to enable a user to download the at least one media attachment.

4. The method of claim 1, wherein the fixed asset information further comprises radio systems, fixed gateways, dispatch centers, communication sites, transceivers, and radio towers, and
   wherein the mobile asset information further comprises mobile communication units (MCUs), radio systems, repeaters, mobile gateways, and radio caches.

5. The method of claim 1, further comprising providing the capability to switch the map interface to a tabular interface that is sortable and filterable.

6. The method of claim 1, further comprising selecting data types via a GUI menu configured to allow a user to establish a relationship between the selected data types.

7. The method of claim 1, further comprising accessing the GUI via an internet web browser.

8. The method of claim 1, wherein the display of fixed asset information is filtered by at least one of frequency band, trunked system type, conventional system type, analog mode, and digital mode.

9. The method of claim 1, wherein the display of mobile asset information is filtered by at least one of frequency band, trunked system type, conventional system type, analog mode, and digital mode.

10. A method for interacting with a communications asset survey and mapping tool via a graphical user interface (GUI), the method comprising:
    overlaying data types on a map interface displayed in the GUI, wherein the data types include fixed asset information further comprising: radio systems, fixed gateways, dispatch centers, communication sites, transceivers, and radio towers;
    filtering display of the data types on the map interface based on at least one of an asset-owning organization and selected geographical areas including states and counties;
    controlling the user's ability to view and modify data-type information depending on at least one of the data type and an asset-owning organization;
    sharing privileges for viewing and modifying the data-type information, wherein the sharing is between an asset-owning organization and another organization or user, and wherein the sharing is enabled and disabled by the asset-owning organization;
    generating reports about the data-type information, wherein the reports include analytics information that is filterable by at least one of an objects summary, fixed assets, and mobile assets; and
    exporting the data-type information to a third-party software application, wherein the data-type information is formatted into tables.

11. The method of claim 10, wherein the analytics information is filterable according to geographical locations including states and counties and allows multiple states and counties to be selected, and wherein the analytics information is filterable according to an asset-owning organization and allows sub-levels of the asset-owning organization to be selected.

12. The method of claim 10, further comprising uploading at least one media attachment and associating the at least one media attachment with a selected data type, wherein the at least one media attachment includes at least one of audio, video, images, and text, and wherein the sharing privileges allow an asset-owning organization to enable a user to download the at least one media attachment.

\* \* \* \* \*